United States Patent
Park

(10) Patent No.: US 11,527,029 B2
(45) Date of Patent: Dec. 13, 2022

(54) METHOD OF CREATING CONFLICT STRUCTURE STORY BY USING IMAGE CARD

(71) Applicant: Sam corporation Inc., Seongnam-si (KR)

(72) Inventor: Jaebum Park, Yongin-si (KR)

(73) Assignee: Sam corporation Inc., Seongnam-si (KR)

( * ) Notice: Subject to any disclaimer, the term of this patent is extended or adjusted under 35 U.S.C. 154(b) by 0 days.

(21) Appl. No.: 17/317,209

(22) Filed: May 11, 2021

(65) Prior Publication Data

US 2021/0264654 A1    Aug. 26, 2021

Related U.S. Application Data

(63) Continuation of application No. PCT/KR2018/014607, filed on Nov. 26, 2018.

(30) Foreign Application Priority Data

Nov. 23, 2018   (KR) .......................... 10-2018-0146826

(51) Int. Cl.
*G06F 3/048*   (2013.01)
*G06T 11/60*   (2006.01)
*G06K 19/06*   (2006.01)
*G06F 3/04842* (2022.01)

(52) U.S. Cl.
CPC .......... *G06T 11/60* (2013.01); *G06F 3/04842* (2013.01); *G06K 19/06037* (2013.01)

(58) Field of Classification Search
None
See application file for complete search history.

(56) References Cited

U.S. PATENT DOCUMENTS

| | | | |
|---|---|---|---|
| 2012/0117473 A1* | 5/2012 | Han | H04N 1/00148 715/723 |
| 2015/0143209 A1* | 5/2015 | Sudai | G06F 40/186 715/202 |
| 2016/0357373 A1* | 12/2016 | Greenberg | G09G 5/005 |

FOREIGN PATENT DOCUMENTS

| | | |
|---|---|---|
| JP | 2018-032330 A | 3/2018 |
| KR | 2009-0032856 A | 4/2009 |
| KR | 10-2012-0065829 A | 6/2012 |
| KR | 10-2013-0129725 A | 11/2013 |
| KR | 10-1574241 B1 | 12/2015 |

(Continued)

OTHER PUBLICATIONS

International Search Report issued in PCT/KR2018/014607; dated Aug. 23, 2019.

*Primary Examiner* — Thanh T Vu

(74) *Attorney, Agent, or Firm* — Studebaker & Brackett PC

(57) ABSTRACT

The present invention relates to a method of creating a story by using image cards, the method including: connecting metadata to an image card and storing the image card; extracting the image card by referring to the metadata based on a keyword received from a user; and disposing the image card extracted by referring to the metadata in a story creation board, in which the image cards having metadata corresponding to characters are disposed at both sides based on a vertical axis of the story creation board, so that a T-shaped structure or a +-shaped structure is formed, and is capable of easily creating a story having a conflict structure between characters.

5 Claims, 5 Drawing Sheets

(56) References Cited

FOREIGN PATENT DOCUMENTS

KR 10-1728099 B1 4/2017
KR 10-1912554 B1 10/2018

* cited by examiner

METHOD OF CREATING CONFLICT STRUCTURE STORY BY USING IMAGE CARD

CROSS-REFERENCE TO RELATED APPLICATIONS

The present application is a continuation of International Patent Application No. PCT/KR2018/014607, filed Nov. 26, 2018, which is based upon and claims the benefit of priority to Korean Patent Application No. 10-2018-0146826, filed on Nov. 23, 2018. The disclosures of the above-listed applications are hereby incorporated by reference herein in their entirety.

TECHNICAL FIELD

The present invention relates to a method of creating a story by using image cards, and to a method and a device for creating a story which are capable of easily creating a story having a conflict structure between characters by using image cards.

BACKGROUND ART

Today, there is a growing interest in how to create User Created Contents (UCC) created by users themselves on YouTube or SNS.

In line with these environmental changes, there is an increasing need for a user to create a story by himself/herself and create various multimedia contents in which visual and auditory media contents are combined based on the story.

However, if a preschooler, elementary school or junior high school student is asked to create a story, the student tends to make a story that is plain and lacks a conflict structure even though the student makes the story.

Accordingly, unlike the related art, there is a need for a method for students to easily create various stories.

Prior Invention 1 (Korea Patent Application Laid-Open No. 10-2012-0065829) relates to "Toddler Story Teaching Aid Set", and provides a background teaching aid in which a background picture corresponding to the development of a fairy tale is expressed and a doll teaching aid of main characters that are to appear in the background pictures of the background teaching aid to enable the toddler to lively direct the fairly story.

The background picture of Prior Invention 1 corresponds to the image card of the present invention, but the story corresponding to the background is already determined, so that Prior Invention 1 is different from the present invention that provides a creative education to enable students to newly create stories.

Prior Invention 2 (Korea Patent Application Laid-Open No. 10-2009-0032856) relates to "Story Association Leaning Material", and relates to a learning material in which a pop-up part protrudes in a learning material including an image and a picture associated from the image and the pop-up part is drawn in a learning material space.

In Prior Invention 2, all of the image and the image protruding in the pop-up part are already determined and cannot be changed, so that Prior Invention 2 is different from the present invention that enables the students to create their own stories according to given keywords.

DISCLOSURE

Technical Problem

Accordingly, the first object to be solved by the present invention is to provide a method of creating a story by using image cards, which is capable of easily creating a story having a conflict structure between characters.

The second object to be solved by the present invention is to provide a device for creating a story by using image cards, which is capable of easily creating multimedia contents by displaying image data of the image card in each slot of a story creation board.

Further, the present invention is to provide a computer-readable recording medium in which a program for executing the method in a computer is recorded.

Technical Solution

In order to achieve the first object, the present invention provides a method of creating a story by using image cards, the method including: connecting metadata to an image card and storing the image card; extracting the image card by referring to the metadata based on a keyword received from a user; and disposing the image card extracted by referring to the metadata in a story creation board, in which the image cards having metadata corresponding to characters are disposed at both sides based on a vertical axis of the story creation board, so that a T-shaped structure or a +-shaped structure is formed.

According to an exemplary embodiment of the present invention, the image card may include a QR code, and the method may further include: receiving image data of the image card when the QR code is received; and displaying the received image data in each slot of the story creation board.

According to another exemplary embodiment of the present invention, the disposing of the image card in the story creation board may include: disposing an image card having metadata corresponding to at least one or more of an era, a background, a reason, an action, and an ending on a vertical axis of the story creation board; and disposing an image card having metadata corresponding to a character at both sides based on the vertical axis of the story creation board.

In order to achieve the second object, the present invention provides a device for creating a story by using image cards, the device including: an image card storing unit configured to connect metadata to an image card and store the image card; an image card extracting unit configured to extract the image card by referring to the metadata based on a keyword received from a user; and an image card disposing unit configured to dispose the image card extracted by referring to the metadata in a story creation board, in which the image cards having metadata corresponding to characters are disposed at both sides based on a vertical axis of the story creation board, so that a T-shaped structure or a +-shaped structure is formed.

In order to solve another technical object, the present invention provides a computer-readable recording medium in which a program for executing the method of creating the story by using the image cards in a computer is recorded.

Advantageous Effects

According to the present invention, it is possible to easily create a story having a conflict structure between characters by disposing image cards having metadata corresponding to an era, a background, a reason, an action, and an ending on a vertical axis of a story creation board and disposing image cards having metadata corresponding to characters at both sides based on the vertical axis.

Further, according to the present invention, it is possible to easily create multimedia contents by displaying image data of the image card in each slot of the story creation board by accessing with a QR code included in the image card.

BEST MODE

In order to achieve the object, the present invention provides a method of creating a story by using image cards, the method including: connecting metadata to an image card and storing the image card; extracting the image card by referring to the metadata based on a keyword received from a user; and disposing the image card extracted by referring to the metadata in a story creation board, in which the image cards having metadata corresponding to characters are disposed at both sides based on a vertical axis of the story creation board, so that a T-shaped structure or a +-shaped structure is formed.

MODE FOR CARRYING OUT THE INVENTION

Hereinafter, an exemplary embodiment of the present invention will be described in detail with reference to the accompanying drawings. The advantages and characteristics of the present invention, and a method for achieving the advantages and characteristics will become clear by referring to the exemplary embodiment, which is described in detail, together with the accompanying drawings. However, the present disclosure is not limited to exemplary embodiments disclosed herein but will be implemented in various forms, and the exemplary embodiments are provided so that the present disclosure is completely disclosed, and a person of ordinary skilled in the art can fully understand the scope of the present disclosure, and the present disclosure will be defined only by the scope of the appended claims.

Unless otherwise defined, all of the terms (including technical and scientific terms) used in the present specification may be used as a meaning commonly understandable by those skilled in the art. Further, terms defined in a generally used dictionary shall not be construed as being ideal or excessive in meaning unless they are clearly defined.

Figure 1:
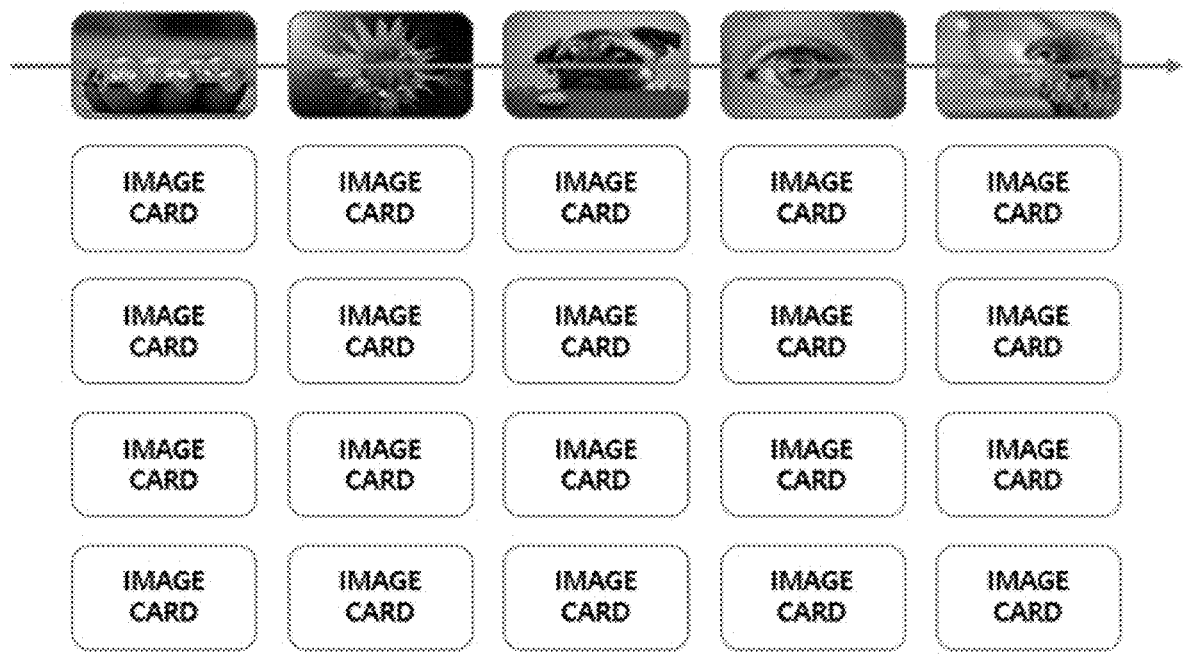
FIG. 1 is a conceptual diagram illustrating a process of creating a story by listing 5 image cards.

FIG. 1 is a conceptual diagram illustrating a process of creating a story by listing 5 image cards.

When image cards are just randomly configured in the process of creating a basic skeleton story like the image cards illustrated in FIG. 1, even if the story is created, the story is made into the story that is plain and lacks a conflict structure even though the story is created.

In FIG. 1, image cards including images of three-colored eggs, sunflower, a shih tzu, a child with blue eyes, and an eagle are sequentially disposed.

The story may be created as follows by using the image cards illustrated in FIG. 1.

"There is a myth that three-colored egg brothers born in the early $2^{nd}$ century ate sunflower seeds and became a shih tzu, a blue-eyed child, and an eagle, respectively."

The story may be created by naturally connecting 5 image cards, but reviewing the created story, it can be seen that the probability is insufficient.

Figure 2:
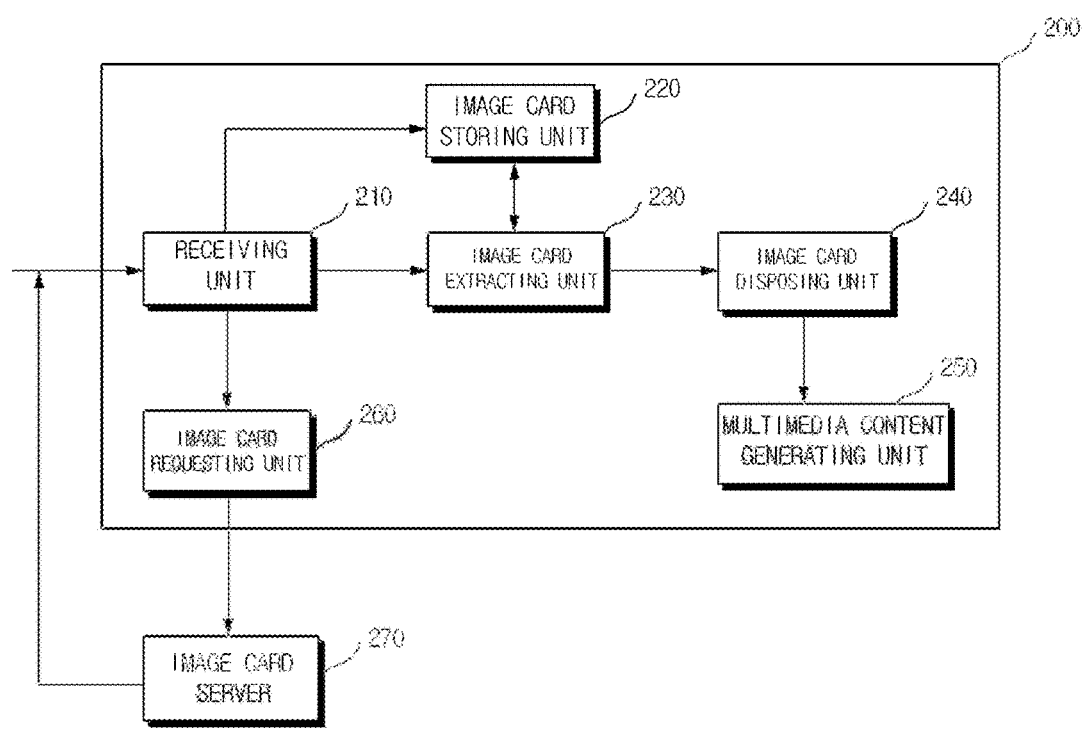
FIG. 2 is a configuration diagram of a story creating device using image cards according to an exemplary embodiment of the present invention.

FIG. 2 is a configuration diagram of a story creating device using image cards according to an exemplary embodiment of the present invention.

Referring to FIG. 2, a story creating device 200 by using image cards according to an exemplary embodiment of the present invention includes a receiving unit 210, an image card storing unit 220, an image card extracting unit 230, an image card disposing unit 240, a multimedia contents creating unit 250, and an image card requesting unit 260.

The receiving unit 210 receives image card data, keywords for searching the image cards, image card metadata, and the like from the outside of the user.

The received image card data and the metadata are transmitted to the image card storing unit 220.

The metadata includes an age limit for using the image on the image card, a field in which the image is used, a text related to the image, length information of the text related to the image, keywords related to the image, and the like.

The age limit for using the image may be classified into Kindergartener to students of $1^{st}$, $2^{nd}$, and $3^{rd}$ grade of the elementary school, students of $4^{th}$ to $6^{th}$ grades of the elementary school, and students of a junior high school, and may also be classified into 6 to 10 years old, 11 to 13 years old, and 14 to 16 years old. For another example, the age may also be classified into under 10, teens, 20s, 30s, 40s, 50s, 60s, 70s or older, and the like, but the age classification method is not limited thereto.

The field in which the image is used may be divided into literature, story (narrative), poetry writing, design, cartoon, art, memory, music, math, media, and the like.

The text related to the image is the story explaining the image, and may be referred when a story is created.

The keyword related to the image is an index used for searching for the image card and presenting the searched image card to the user. When the image is related to a specific story, the words, such as a title and a character name of the specific story, associating the story, may be designated as keywords.

The image card storing unit 220 receives image card data and metadata from the receiving unit 210 and stores the received data. It is preferable to match and store the image card and the metadata. Further, the image card storing unit

220 transmits the image card data and the metadata to the image card extracting unit 230.

It is desirable to prepare an image card that is a basic material for creating a story of multimedia contents in advance and store metadata in correspondence with each image card. Further, the image card storing unit 220 may receive a new image card and metadata through a separate image card server 270 and store the received image card and metadata.

The image card extracting unit 230 receives a keyword or a search word input by the user from the receiving unit 210, and extracts image card data and metadata from the image card storing unit 220 by referring to the metadata based on the received keyword or search word.

The image card disposing unit 240 disposes the extracted image card and metadata in each slot of the story generation board.

In the meantime, it is preferable to dispose the image card having metadata corresponding to the era, background, reason, action, and ending in a vertical axis of the story creation board, and dispose the image card having metadata corresponding to a character at both sides based on the vertical axis of the story creation board.

The multimedia content generating unit 250 generates multimedia contents, such as videos, by using the image cards disposed in the story creation board and the text included in the metadata. In this case, the text of the metadata may be displayed with a subtitle of the image card, and when the user records his/her voice in correspondence with each image card, the recorded voice may also be output while the image card is displayed.

When the receiving unit 210 receives a QR code, the image card requesting unit 260 requests the image card and the metadata from the image card server 270 with an URL address or IP address corresponding to the QR code.

The image card server 270 transmits the image card and the metadata to the receiving unit 210 according to the request of the image card requesting unit 260.

The image card received by the receiving unit 210 may further include video information including the image, in addition to a static image in the image card.

The metadata of the image card received in the receiving unit 210 passes through the image card extracting unit 230 and the image card disposing unit 240 disposes the image card in the story creation board. In this case, the image card disposing unit 240 is desirable to determine a location of the image card and dispose the image card by referring to the metadata.

Figure 3:
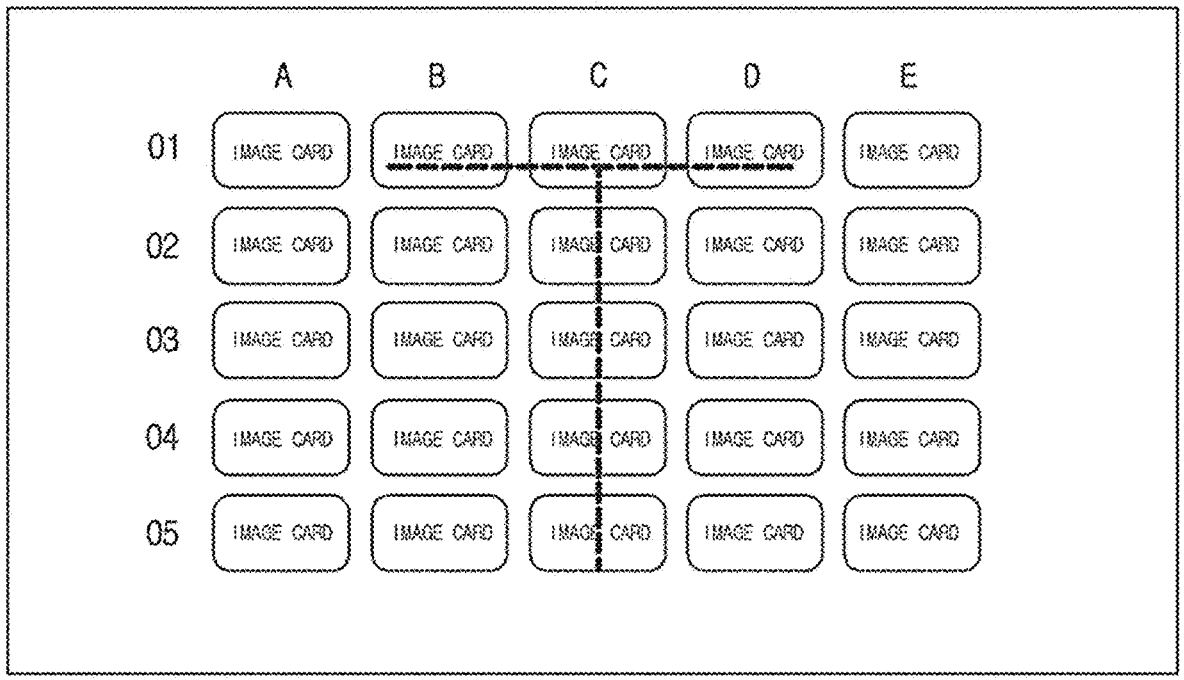
FIG. 3 illustrates a story creation board according to the exemplary embodiment of the present invention, which easily schematizes a conflict structure by disposing image cards in the form of T.

FIG. 3 illustrates the story creation board according to the exemplary embodiment of the present invention, which easily schematizes a conflict structure by disposing image cards in the form of T.

Referring to FIG. 3, when the image card is disposed in the story creation board, the image cards may be disposed in the T-shaped structure. When the story is created through the T-shaped structure, the story having a conflict structure may be easily created.

The image card may be produced with a card using a real picture, and hand-drawn pictures and the like may also be included in the image card.

The story creation board and the image card illustrated in FIG. 3 may be implemented through a separate application, and the image card disposed in the story creation board may be used for configuring a video in a predetermined order.

Figure 4:
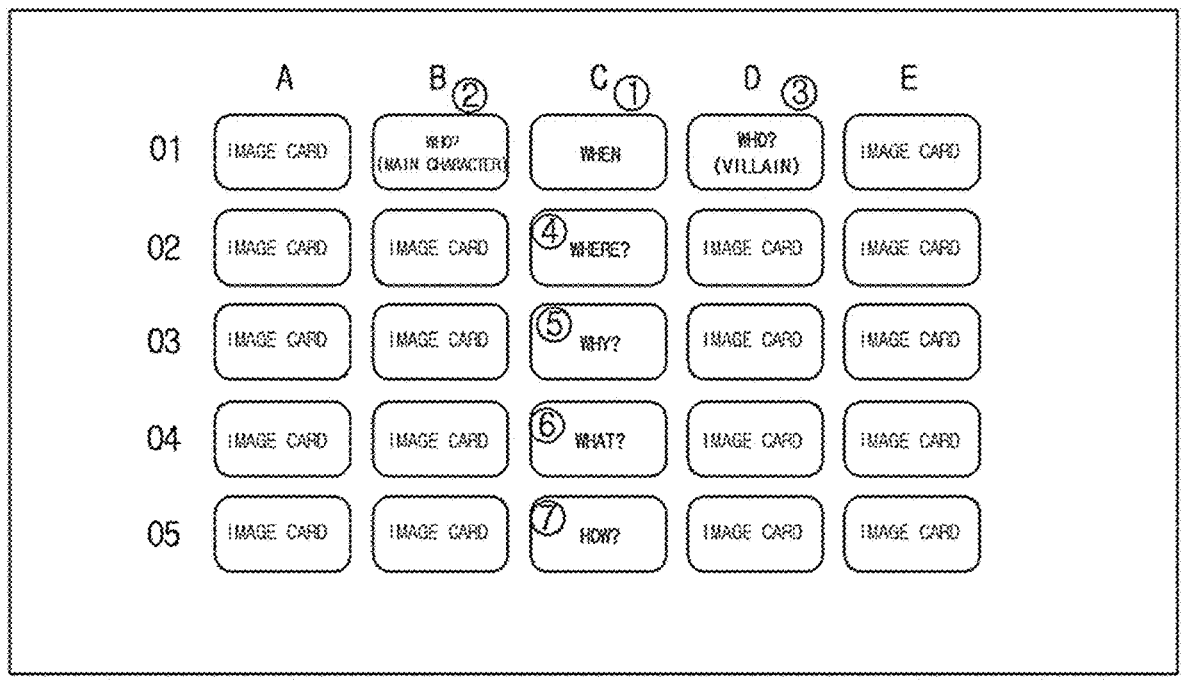
FIG. 4 illustrates an example of disposing image cards in a T-shaped structure of the story creation board illustrated in FIG. 3.

FIG. 4 illustrates an example of disposing image cards in the T-shaped structure of the story creation board illustrated in FIG. 3.

Referring to FIG. 4, the image cards related to 5W1H and characters of the story are disposed in the T-shape of the story creation board, and the image cards corresponding to a main character and an opposing villain are disposed on the horizontal axis at the top of the story creation board, and a helper of each of the main character and the villain is disposed outside the main character and the villain. Through the disposition structure, the helper of each character may be easily recognized.

Further, the image cards corresponding to when, where, why, what, and how are disposed in the vertical axis of the story creation board so that the overall T-shape is formed. When the image cards disposed in the story creation board are used for configuring the multimedia contents of the video and the like, the image cards may be included in the video in a predetermined order. In the case of FIG. 4, the image cards may be included in the video in the order of when, who (main character), who (villain), where, why, what, and how.

Figure 5:
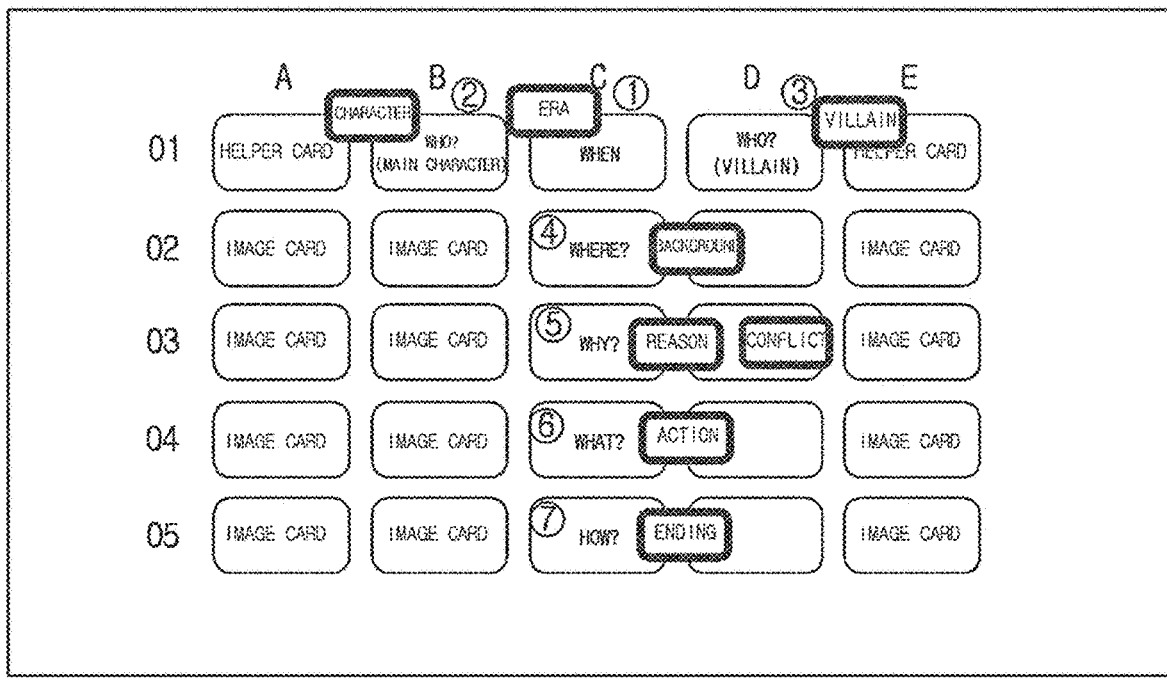
FIG. 5 presents particular contents of image cards related to 5W1H and characters of the story creation board illustrated in FIG. 4 as an example.

FIG. 5 presents particular contents of image cards related to 5W1H and characters of the story creation board illustrated in FIG. 4 as an example.

Referring to FIG. 5, "when" corresponds to "era", "where" corresponds to "background", "why" corresponds to "reason" or "conflict", "what" corresponds to "action", and "how" corresponds to "ending".

Further, "who" corresponds to "main character" and "villain character".

In the case of FIG. 5, each image card may include at least one of the main character, the villain character, the era, the background, the reason or conflict, the action, and the ending as metadata.

The image cards corresponding to the era, the background, the reason, the conflict, the action, and the ending are disposed on the vertical axis of the story creation board, and the image cards corresponding to the main character and the villain character are disposed at both sides based on the vertical axis so that the overall T-shape is formed.

Figure 6:
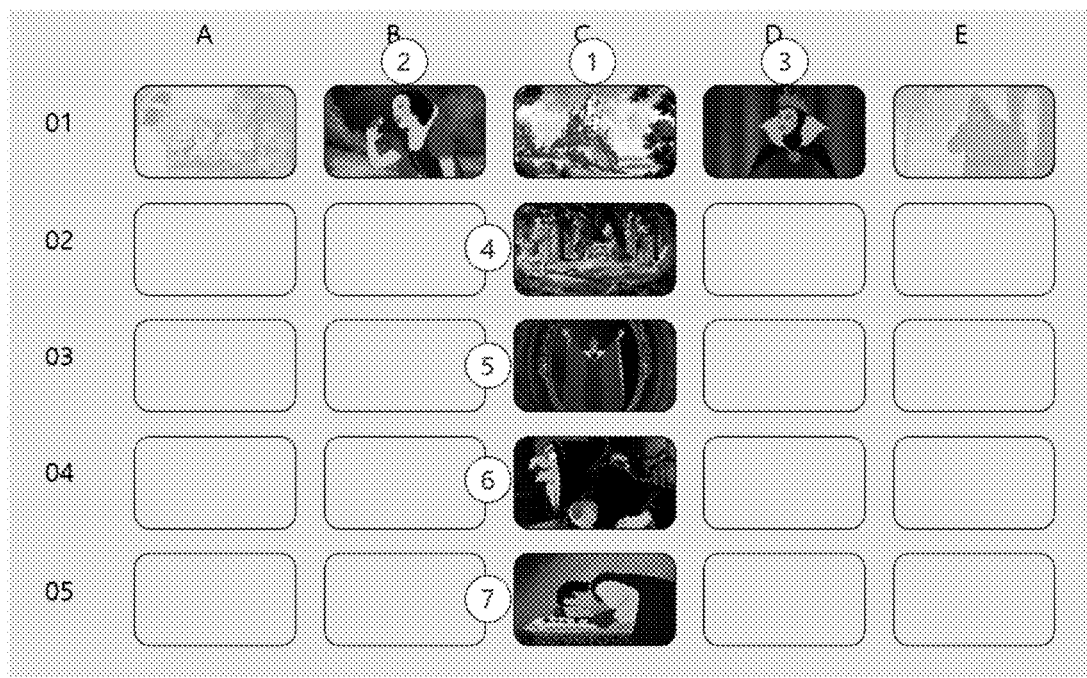
FIG. 6 illustrates a disposition of actual image cards in the story creation board according to the exemplary embodiment of the present invention.

FIG. 6 illustrates a disposition of actual image cards in the story creation board according to the exemplary embodiment of the present invention.

Referring to FIG. 6, the main character, Snow White, is disposed at the left side of the vertical axis from the top row based on the vertical axis of the story creation board, and the villain Queen is disposed at the right side from the top row based on the vertical axis.

Each of the image cards corresponding to the era, the background, the reason, the conflict, the action, and the ending corresponding to the 5W1H is disposed in the vertical axis.

In the meantime, the Seven Dwarfs, the helpers of Snow White, are disposed at the left side of the image card of Snow White, and the Hunter, the helper of the Queen, is disposed at the right side of the image card of the Queen.

Figure 7:
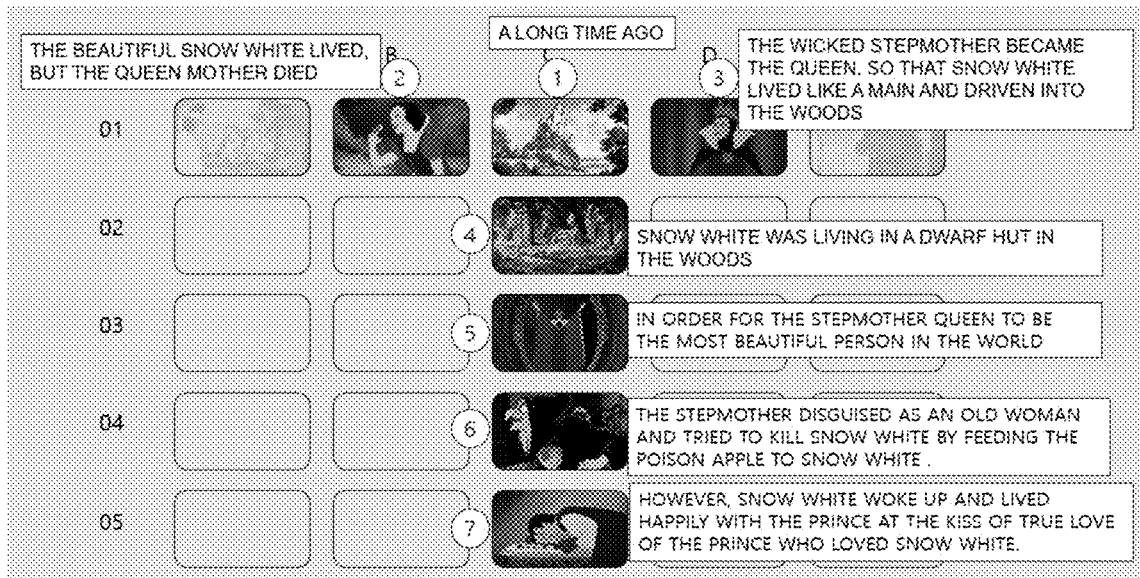
FIG. 7 illustrates a text of metadata corresponding to each image card in the story creation board in which image cards are disposed like FIG. 6.

FIG. 7 illustrates a text of metadata corresponding to each image card in the story creation board in which image cards are disposed like FIG. 6.

A text of the metadata corresponding to the image cards illustrated in FIG. 7 is illustrated one by one.

As another exemplary embodiment, for the text of the metadata corresponding to the image card, multiple texts may be matched to one image card and stored and the user may select one among the multiple texts, and the user may directly write and store the text corresponding to the image card.

When the texts illustrated in FIG. 7 are connected in an order, the story represented in Table 1 may be created.

TABLE 1

A long time ago (era)
the beautiful Snow White lived, but the queen mother died
(the main characters)
the wicked stepmother became the queen, so that Snow
White lived like a main and driven into the woods (villain)
Snow White was living in a dwarf hut in the woods (background)
in order for the stepmother queen to be the most beautiful person
in the world (reason, conflict)
the stepmother disguised as an old woman and tried to kill Snow
White by feeding the poison apple to Snow White (action).
However, Snow White woke up and lived happily with the prince
at the kiss of true love of the prince who loved Snow White (ending).

When the existing Snow White story is reorganized with the image cards, it can be seen that when the story is disposed in the T-shaped structure, a more natural conflict structure story is created. When various image cards are disposed in the T-shaped story creation board, multiple stories may be created, as well as the Snow White story, and the story having the more natural structure is created. Further, multimedia contents may be produced based on the created story.

Figure 8:
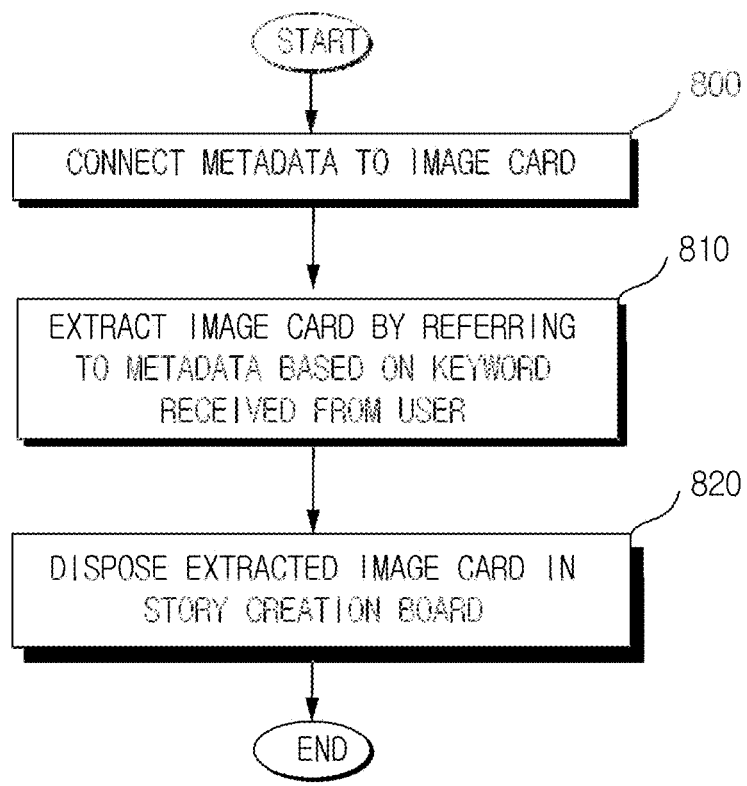
FIG. 8 is a flowchart illustrating a story creation method using image cards according to an exemplary embodiment of the present invention.

FIG. 8 is a flowchart illustrating a story creation method using image cards according to an exemplary embodiment of the present invention.

Referring to FIG. 8, a story creation method using image cards according to an exemplary embodiment of the present invention includes operations time-serially processed in the story creation device using the image cards illustrated in FIG. 2. Accordingly, even if omitted below, the contents described above in relation to the story creation device using the image cards illustrated in FIG. 2 are also applicable to the story creation method using the image cards according to the present exemplary embodiment.

In operation 800, the story creation device connects metadata to an image card and stores the metadata.

The metadata may include an age limit for using the image on the image card, a field in which the image is used, a text related to the image, length information of the text related to the image, keywords related to the image, and the like.

Further, the metadata may include an era, a background, a reason, an action, an ending, a character, and the like.

In operation 810, the story creation device extracts the image card by referring to the metadata based on a keyword received from a user.

The received keyword is an index used by the user for searching for the image card. When the image is related to a specific story, the words, such as a title and a character name of the specific story, associating the story, may be designated as keywords, but the present invention is not limited thereto.

In operation 820, the story creation device disposes the extracted image card in the story creation board by referring to the metadata.

When the image cards are disposed in the story creation board, it is preferable to dispose the image card having metadata corresponding to the era, background, reason, action, and ending in a vertical axis of the story creation board, and dispose the image card having metadata corresponding to a character at both sides based on the vertical axis of the story creation board.

When the image cards having the metadata corresponding to the characters are disposed at both sides based on the vertical axis of the story creation board, a T-shaped conflict structure is formed.

Then, the story creation device according to the exemplary embodiment of the present invention may generate multimedia contents, such as a video, by using the image cards disposed in the story creation board and texts included in the metadata. In this case, the text of the metadata may be displayed with a subtitle of the image card, and when the user records his/her voice in correspondence with each image card, the recorded voice may also be output while the image card is displayed.

Figure 9:
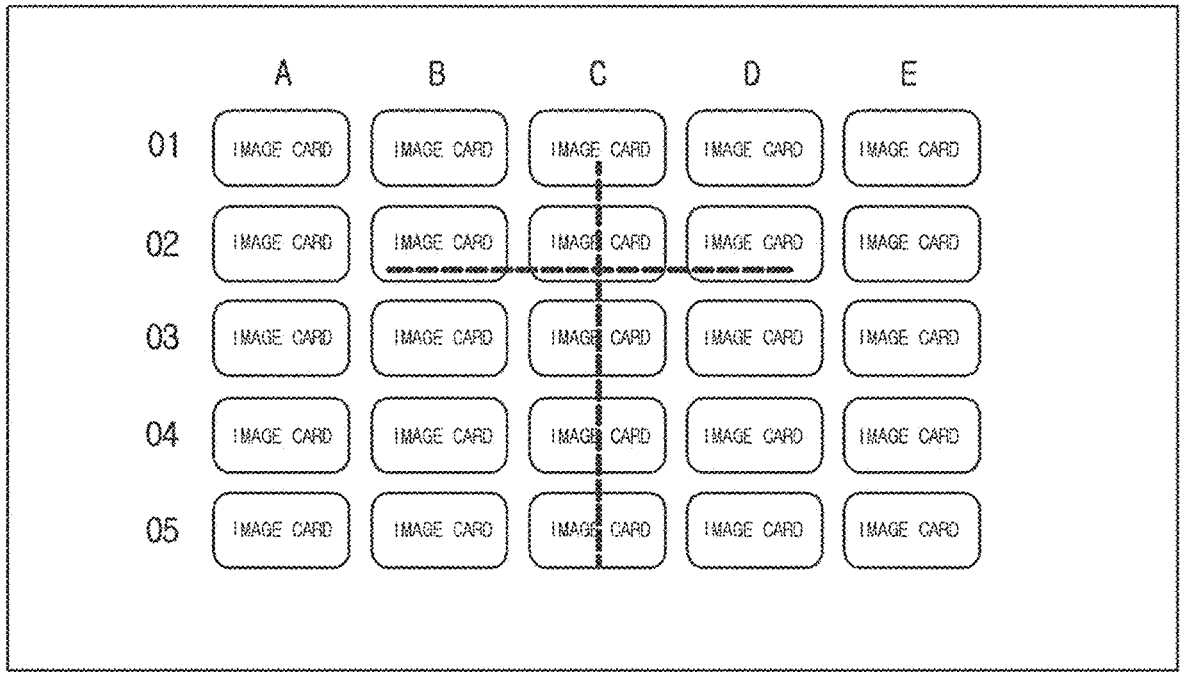
FIG. 9 illustrates a story creation board according to according to another exemplary embodiment of the present invention, which easily schematizes a conflict structure by disposing image cards in the form of +.

FIG. 9 illustrates a story creation board according to according to another exemplary embodiment of the present invention, which easily schematizes a conflict structure by disposing image cards in the form of +.

Referring to FIG. 9, when the image cards are disposed in the story creation board, the image cards may be disposed in a +-shaped structure. When the story is created through the +-shaped structure, the story having the conflict structure may be easily created.

When the image cards disposed in the story creation board are used in configuring the multimedia contents of the video and the like, a predetermined order may be changed according to the location of the horizontal axis in the +-shaped structure. This will be described in more detail with reference to FIG. 10.

Figure 10:
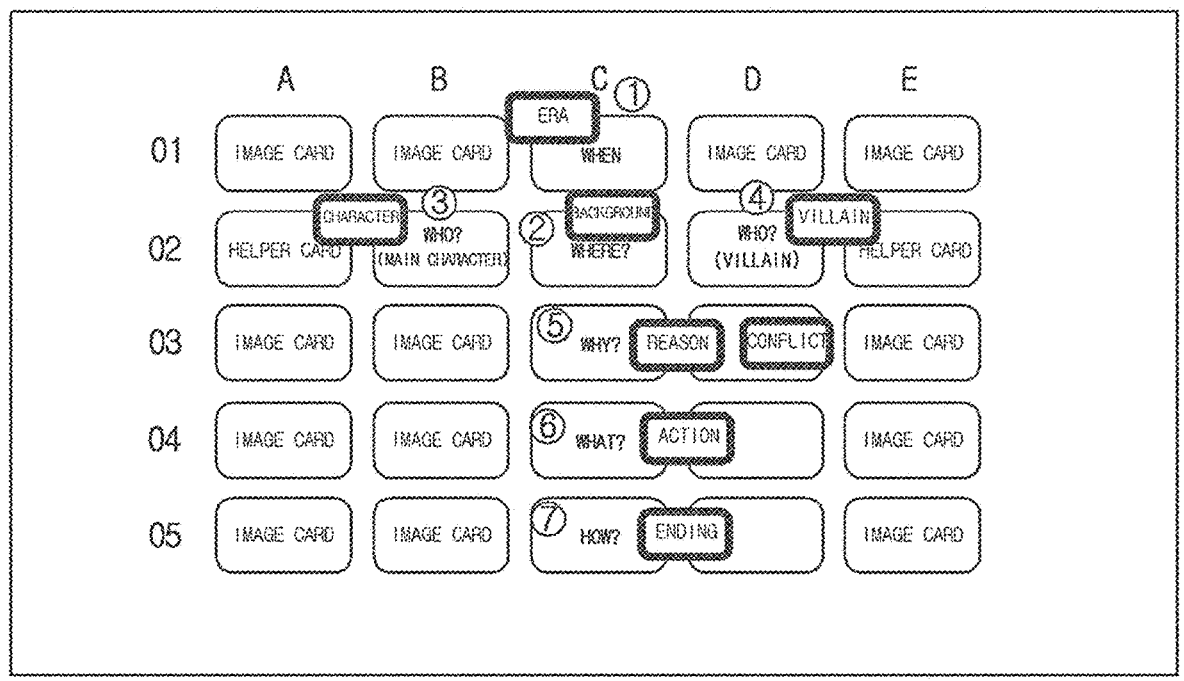
FIG. 10 presents particular contents of image cards related to 5W1H and characters of the story creation board in the form of + illustrated in FIG. 9 as an example.

FIG. 10 presents particular contents of image cards related to 5W1H and characters of the story creation board in the form of + illustrated in FIG. 9 as an example.

When FIG. 10 in which the +-shaped story creation board is illustrated is compared with FIG. 5 in which the T-shaped story creation board is illustrated, the image card having the metadata corresponding to when is displayed and then the image card having the metadata corresponding to the character is displayed according to the story order in FIG. 5, but the image card having the metadata corresponding to when is displayed, the image card having the metadata corresponding to the background is displayed, and then the image card having the metadata corresponding to the character is displayed in FIG. 10.

Accordingly, the order of the display of the image card may be changed when the image card is used for configuring the multimedia contents, such as the video, depending on the location of the horizontal axis of the story creation board in the vertical axis.

The exemplary embodiments of the present invention may be implemented in the form of a program command that can be executed through various computer means and recorded in a computer readable medium. The computer readable medium may include a program command, a data file, a data structure, and the like alone or in combination. The program command recorded in the medium may be specially designed and configured for the present invention, or may also be known and usable to those skilled in computer software. Examples of the computer readable recording medium include a magnetic medium, such as a hard disk, a floppy disk, or a magnetic tape, an optical recording medium, such as a CD-ROM or a DVD, a magneto-optical medium, such as a floptical disk, and a hardware device which is specifically configured to store and execute the program command such as a ROM, a RAM, and a flash memory. An example of the program command includes a high-level language code executable by a computer by using an interpreter, and the like, as well as a machine language code created by a compiler. The hardware device may be configured to be operated with one or more software modules in order to perform the operation of the present invention, and an opposite situation thereof is available.

In the foregoing, the present invention has been described based on the exemplary embodiments. Those skilled in the art will appreciate that various modifications, additions and substitutions are possible in the range without departing from the essential characteristic of the present invention. Accordingly, the disclosed exemplary embodiments should be considered from a descriptive point of view, rather than a limiting point of view. The scope of the present invention is presented in the claims, not the foregoing description, and it should be construed that all of the differences within the equivalent range are included in the present invention.

The invention claimed is:

1. A method of creating a story by using image cards, the method comprising:
   connecting metadata to a respective image card and storing the respective image card;
   receiving one or more keywords from a user;
   retrieving image cards by referring to the metadata corresponding to the received keywords; and
   positioning the retrieved image cards on a story creation board, by referring to the metadata of the retrieved image cards,
   wherein the positioning comprises:
      positioning, on the story creation board, one or more first image cards of the retrieved image cards along with a vertical axis of the story creation board, wherein the one or more first image cards are connected with metadata corresponding to at least one or more of an era, a background, a reason, an action, and an ending of the story; and
      positioning, on the story creation board, one or more second image cards of the retrieved image cards on either a left side or a right side of the vertical axis of the story creation board, wherein the one or more second image cards are connected with metadata corresponding to a character in the story.

2. The method of claim 1, wherein the image card includes a QR code, and the method further comprises:
   receiving image data of the image card when the QR code is received; and
   displaying the received image data in each slot of the story creation board.

3. A non-transitory computer-readable recording medium in which a program for executing the method of claim 1 in a computer is recorded.

4. The method of claim 1, further comprising:
   creating a video which displays the image cards in an order of:
      an uppermost first image card, which is positioned on an uppermost area of the vertical axis, among the one or more first image cards;
      at least one third image cards, which is positioned on a same horizontal line with the uppermost first image card, among the one or more second image cards;
      a first middle first image card, which is positioned directly below the uppermost first image card, among the one or more first image cards;
      at least one fourth image card, which is positioned on a same horizontal line with the first middle first image card, among the one or more second image cards;
      a second middle first image card, which is positioned directly below the first middle first image card, among the one or more first image cards;
      at least one fifth image card, which is positioned on a same horizontal line with the second middle first image card, among the one or more second image cards;
      a third middle first image card, which is positioned directly below the second middle first image card, among the one or more first image cards; and
      at least of sixth image card, which is positioned on a same horizontal line with the third middle first image card, among the one or more second image cards.

5. The method of claim 1, wherein the positioning the one or more second image cards comprises:
   positioning, on the story creation board, a third image card and a fourth image card of the retrieved image cards on both side of the vertical axis of the story creation board, wherein the third image card is an image card of a main character of the story, and the fourth image card is image card of an opposing villain of the story; and
   positioning, on the story creation board, a fifth image card and a sixth image card of the retrieved image cards on outside of the third image card and the fourth image card, respectively, wherein the fifth image card is an image card of a helper of the main character of the story, and the sixth image card is an image card of a helper of the opposing villain of the story.

* * * * *